United States Patent [19]  [11] 4,329,164
Kilian et al.  [45] May 11, 1982

[54] PROCESS FOR THE GRANULATION OF GLASS MELTS

[75] Inventors: Eberhard Kilian, Hanau; Georg Schneider, Hasselroth, both of Fed. Rep. of Germany

[73] Assignee: Degussa Aktiengesellschaft, Frankfurt, Fed. Rep. of Germany

[21] Appl. No.: 159,853

[22] Filed: Jun. 16, 1980

[30] Foreign Application Priority Data

Jun. 15, 1979 [DE] Fed. Rep. of Germany ....... 2924303

[51] Int. Cl.³ .............................................. C03C 12/00
[52] U.S. Cl. ........................................ 65/21.2; 65/137
[58] Field of Search ................. 65/17, 21.2, 141, 137; 264/5, 8, 13, 14; 425/7

[56] References Cited

U.S. PATENT DOCUMENTS 2,470,569 5/1949 Meighan et al. ......................... 425/7
2,956,304 10/1960 Batten et al. ............................ 425/7
2,978,743 4/1961 Osborne .................................. 65/141
3,551,532 12/1970 Laird ....................................... 425/7

FOREIGN PATENT DOCUMENTS 902795 8/1962 United Kingdom .................... 264/8

Primary Examiner—Richard V. Fisher
Attorney, Agent, or Firm—Cushman, Darby & Cushman

[57] ABSTRACT

There is described a process and an apparatus for the granulation of glass melts by bringing the melt into contact with water, in which there is obtained a homogeneous granulate without oversize grains and glass threads. This is attained by impacting the vertically downwardly flowing glass melt all around with laterally slanting downwardly directed high pressure water jets. The apparatus consists essentially of an overflow channel to an overflow funnel and a collecting container, wherein there is arranged below the overflow channel a preferably U-shaped nozzle carrier which entirely or partially surrounds the melt and carries nozzles with a conical angle of 15°–180° sloping downwardly.

5 Claims, 3 Drawing Figures

PROCESS FOR THE GRANULATION OF GLASS MELTS

BACKGROUND OF THE INVENTION

The invention is directed to a process for the granulation of glass melts by bringing the glass melt into contact with water and an apparatus for carrying out the process.

It is desirable to cool glass melts, particularly glaze frit melts, with water during the process of drawing off from the melt furnace or melt tank or the like so that there are collected directly after the granulating apparatus uniform glass granules in the size range between 0.5 and 5 mm and of the amount formed there are excluded those which are substantially larger or substantially smaller.

It is known to convey the melt slowly into water filled vats to granule glaze frit melts and to carry out the granulation process by this way. With sufficiently long conveyance time and with stirring of the granulated melt in the vats, glass melts can be granulated in this manner.

The disadvantage of this process is that with middle viscosity and viscous frits very different sized granules form, about 5 to 50 mm and greater.

The invention is based on the problem of finding a process and apparatus for the granulation of glass melts by bringing the glass melt into contact with water which results in a uniform granulate directly after the melt exits from the furnace in the flow without further subsequent commuinution.

SUMMARY OF THE INVENTION

This problem was solved according to the invention by impacting the vertically downwardly flowing glass melt all around with laterally slanting downwardly directed high pressure water jets. Preferably the pressure of the water jets is between 20 and 500 bar. Especially preferred has been found water pressure of 70 to 200 bar.

The angle at which the high pressure water jets meets the downwardly flowing glass melt is advantageously between 15° and 180°, based on the conical angle which results from the intersection of the water jets of two nozzles placed opposite each other. Preferably the conical angle is between 60° and 180°.

This granulation process is advantageously carried out with an apparatus which consists essentially of an overflow channel for the glass melt, an overflow funnel and a collecting container for the granulate wherein there is arranged below the overflow channel a nozzle carrier which entirely or partially surrounds the downwardly falling glass melt and simultaneously serves as the water supply, and several nozzles are arranged on the nozzle carrier slanting downwardly at a conical angle of 15°–180°. Preferably the nozzles are arranged at a conical angle of 60° to 180°.

The nozzles can either be constructed as bores in the jet carrier or consist of constructed inserted nozzles. The number of nozzles per meter of nozzle carrier generally is 10 to 40.

It is advantageous to build the nozzles as flat section jets with an angle opening of 10° to 90°. Preferably adjacent nozzles are arranged at different angles so that the flat section water jets are constructed in overlapping fashion but do not touch on the sides.

Figure 2:
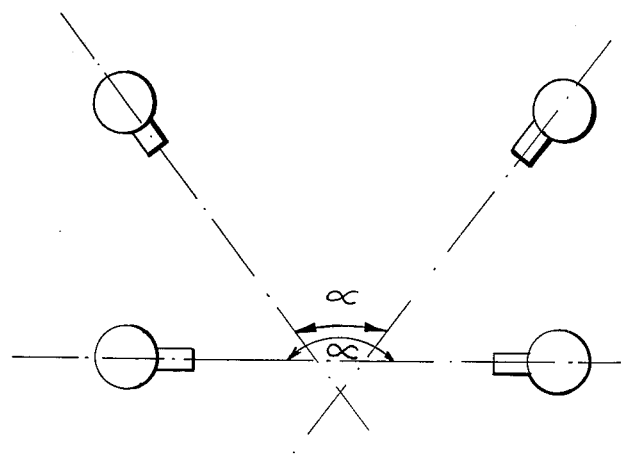
FIG. 2 schematically shows the angle at which two jets from opposite sides of the melt meet.

Referring more specifically to the drawings the apparatus consists of an overflow channel (or groove) 1 for the glass melt 2, an overflow funnel 3 and a collecting container 4. Below the overflow channel 1, which is fed from a glass melt furnace, there is installed a nozzle carrier 5 which entirely or partially surrounds the downwardly falling glass melt 2. Preferably this nozzle carrier 5 is constructed U-shaped. It carries a series of flat section jet nozzles 6, for example having an opening angle of 30° and a nozzle diameter of 1.2 to 2 mm. These are arranged under an angle ($\alpha$) of for example 70°, for the first nozzle carrier and 180° for the second one see FIG. 2. These nozzles are arranged in such way that the second nozzle carrier is fastened in the jet cutting plain of the first one. The nozzles 7 of the cross connection 8 between the two U-shaped legs 9 in so doing are directed substantially vertically downwardly. The nozzles 6 on the two U-shaped legs 9 are so arranged oppositely parallel that the flat section jets are constructed with their sides not contacting, but overlapping. The U-shaped nozzle carrier 5 is so arranged along the overflow channel 1, in which the glass flux out of the furnace first runs, that the melt 2 can shoot over the channel 1 into the open U of the nozzle carrier. Depending on whether the melt is viscous or less viscous, the glass flux shoots out further or less in the direction of the slope of the channel 1, before it is deflected downwardly by the force of gravity.

The glass flux 2 is there intensively comminuted where it contacts the individual nozzle jets. The dimensions of the nozzle carrier depend on the amount of melt, the viscosity of the melt and the water pressure. The overflow channel 3 is so arranged that the glass granulates with the supplying water jets 11 meet on the cone wall 10 in such manner that they flow rotatingly in spirals into the collection container 4. Several nozzle carriers arranged one after the other to form a cascade can be useful. The particle distribution will then be finer and more equal.

Other nozzle arrangements, e.g. concentric or steel shapes and pressures and likewise give useful granulation results.

The process can comprise, consist essentially of or consist of the steps set forth. The apparatus can comprise, consist essentially of or consist of the stated elements.

Figure 1:
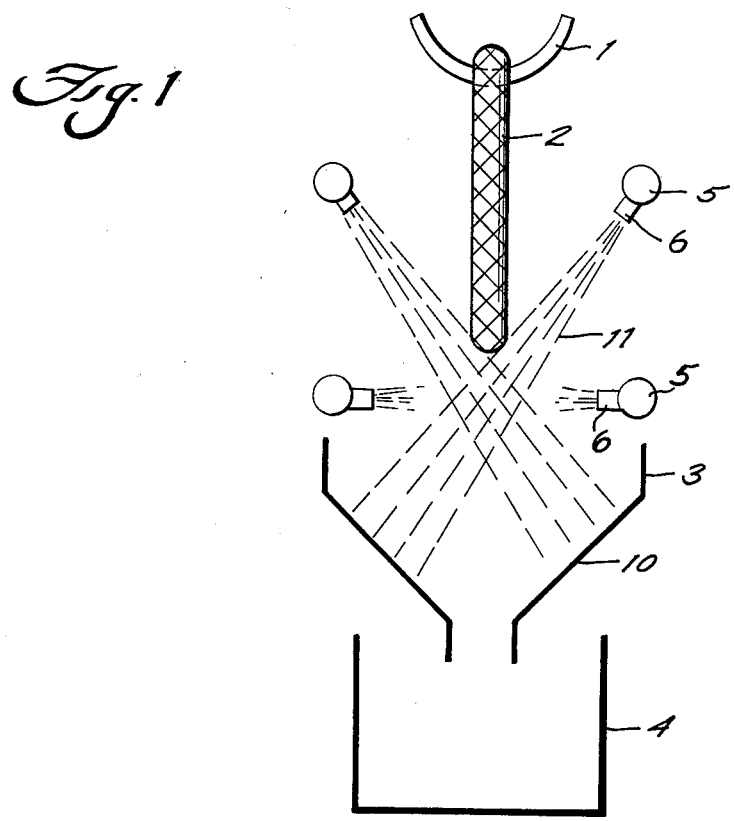
FIG. 1 is a schematic view looking at the apparatus from above.
Figure 3:
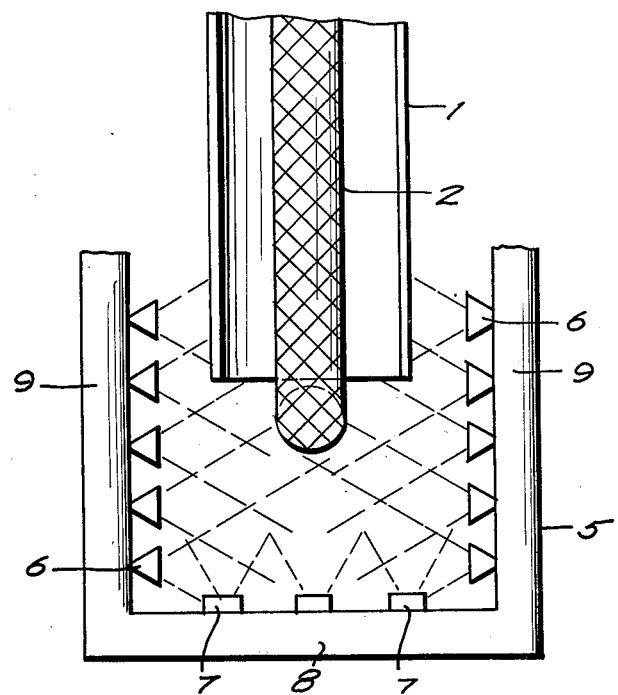
FIG. 3 is a side view of the apparatus of FIG. 1.

The following examples explain the process in more detail. In the Examples there was used an apparatus according to FIGS. 1, 2 and 3.

DESCRIPTION OF THE PREFERRED EMBODIMENTS

Example 1

800 kg of a middle viscosity glass melt were run out of a rotary furnace in about 3 minutes over the overflow channel into the nozzle carrier and the melt granulated during the passing. The water pressure was 75 bar, the amount conveyed 255 l/min.

The result was a granulate with a particle distribution between 1 and 3 mm. There were not formed either glass fibers or granulates substantially over 3 mm.

Without the granulation apparatus of the invention there was obtained a granulate with a particle distribution between 3 and 10 mm and with portions up to 50. The discharge time for this was about 10 minutes.

Example 2

700 kg of an extremely viscous frit melt was drawn off from a rotary furnace as described in Example 1 in 10 minutes. The particles distribution was between 3 and 10 mm. The water pressure was 130 bar, the amount converged 350 l/min.

Without employing the granulating apparatus of the invention the particle distribution was between 5 and 50 mm, the discharge time about 20 minutes.

What is claimed is:

1. A process for granulating a glass melt by contacting said glass melt with water, comprising impacting a vertically downwardly flowing melt all around with high pressure water jets wherein said pressure of said water jets is between 20 and 500 bar and the angle of said high pressure water jets to said vertically downwardly flowing glass melt, down as a conical angle, is between 15° and 180°.

2. A process according to claim 1 wherein the angle of the high pressure water jets is between 60° and 180°.

3. A process according to claim 1 wherein the pressure of the water jets is between 70 and 200 bar.

4. A process according to claim 3 wherein the angle of the high pressure water jets is between 60° and 180°.

5. A process according to claim 1, wherein a cascade of nozzle carriers, especially two nozzle carriers, is arranged in such a way that the second nozzle carrier is fastened in the jet cutting plain of the first one, the first nozzle carrier having a conical angle of 70° and the second one having a conical angle of 180°.

* * * * *